United States Patent
O'Toole

(10) Patent No.: US 7,177,413 B2
(45) Date of Patent: Feb. 13, 2007

(54) HEAD POSITION BASED TELEPHONE CONFERENCE SYSTEM AND ASSOCIATED METHOD

(75) Inventor: James O'Toole, Somerville, MA (US)

(73) Assignee: Cisco Technology, Inc., San Jose, CA (US)

( * ) Notice: Subject to any disclaimer, the term of this patent is extended or adjusted under 35 U.S.C. 154(b) by 807 days.

(21) Appl. No.: 10/427,170

(22) Filed: Apr. 30, 2003

(65) Prior Publication Data

US 2004/0218745 A1 Nov. 4, 2004

(51) Int. Cl.
*H04M 3/42* (2006.01)
(52) U.S. Cl. .................... 379/202.01; 381/17
(58) Field of Classification Search ...................... None
See application file for complete search history.

(56) References Cited

U.S. PATENT DOCUMENTS

| | | | |
|---|---|---|---|
| 5,335,011 A | 8/1994 | Addeo et al. | |
| 5,550,585 A * | 8/1996 | Cherri | 348/207.99 |
| 5,991,385 A | 11/1999 | Dunn | |
| 6,011,851 A * | 1/2000 | Connor et al. | 381/17 |
| 2003/0100274 A1 * | 5/2003 | Brown | 455/90 |
| 2004/0013252 A1 * | 1/2004 | Craner | 379/142.01 |
| 2005/0129250 A1 * | 6/2005 | Aubauer et al. | 381/17 |

* cited by examiner

*Primary Examiner*—Creighton Smith
(74) *Attorney, Agent, or Firm*—Marger Johnson & McCollom P.C.

(57) ABSTRACT

The invention relates to a telephone conference system and an associated method. A conference phone includes a plurality of input audio signals and a spatial preference sensor adapted to identify a listening preference associated with at least one conference participant. The spatial preference sensor might indicate a head position of a conference participant, such that small movements of the participant's head control processing of a plurality of input signals resulting in a more audibly intelligible conference.

25 Claims, 5 Drawing Sheets

HEAD POSITION BASED TELEPHONE CONFERENCE SYSTEM AND ASSOCIATED METHOD

BACKGROUND OF THE INVENTION

1. Field of the Invention

The invention relates to a conference system and, more particularly, to a telephone conference system that uses head position to filter and tune room audio.

2. Description of the Related Art

Teleconferencing systems bring multiple parties together from remote locations. Ideally, teleconferencing systems allow participants to communicate with each other as if they were seated in the same room. A teleconferencing system includes at least two stations set up in remote rooms interconnected by a transmission system such as the telephone system.

Participants at each of the stations communicate with each other through video and audio equipment. Video equipment typically includes cameras, displays, and the like. A digital video camera, for example, records participants' images in a first room and generates a video signal that is transmitted via the transmission system to a second station. The display reproduces the transmitted video signal such that conference participants in the second station can identify participants in the first station by looking at the display screen.

Audio equipment for each station typically includes one or more microphones, speakers, and the like. The microphones pick up participants' voices in the first station and generate an audio signal that is transmitted via the transmission system to the second, remote, station. The speakers reproduce and amplify the audio signal transmitted from the first to the second station.

Teleconferencing systems have visual and audio drawbacks. Often there is a time delay between the transmitted video and audio signals. In this case, speech precedes the visual mouth movement of the speaking participant shown on the display. While content is not necessarily appreciable altered, the time delay often results in confusing communication cues, e.g., a conference participant might wait until the displayed image of the speaking participant finishes moving his mouth even though the audio message ended sometime before and the speaking participant awaits a reply. And the video signal is typically compressed before being transmitted often degrading the quality of the displayed image.

Room echoes, feedback, noise, and the like adversely affect audio quality. Improved intelligibility occurs by using speakerphones that address these issues as well as discriminate between several people speaking from different locations in a station. In order to create a more realistic sense of a virtual conference among participants, teleconferencing systems add a sound field effect to the conference phone capability to create a sense of spatial location among the participants. Even so, conference participants sharing a single speakerphone in the first station experience difficulty understanding other participants in the second station since the single speakerphone receives monoaural audio through the phone system. That is, speakerphones typically mix the incoming sound sources into a single point source. A point source is defined as a spatial location audibly perceived as sourcing one or more sounds. For example, when person listens to an orchestra, he audibly perceives the different musical instruments as coming from different point sources. Conversely, when a person listens to a telephone conference call, he perceives the voices on the telephone lines as coming from a single point source.

Since the sounds in a telephone conference call appear to all come from a single point source, a listener has difficulty differentiating between the incoming sources, i.e., different speakers. Techniques employing stereo conference calling do not allow the user to move incoming sound sources into perceptibly different foreground and background sources. Since each sound source appears to come from the same location, audio intelligibility for one specific sound source of interest is decreased when multiple sound sources are broadcast at the same time. This is made worse if no video signal with its visual cues accompanies the audio. And the speakerphone might cut the participants voices on and off in an effort to reduce noise if it does not properly detect their voice.

Many have addressed this problem. For example, multiple microphones are placed in specific locations of the source station and a corresponding number of speakers are similarly located in the receiving room. And the multiple microphones might be voice activated. Dunn (U.S. Pat. No. 5,991,385) discloses a teleconferencing system that includes a speakerphone for each conference participant. Addeo et al. (U.S. Pat. No. 5,335,011) disclose a teleconferencing system where participants use a cursor on a video image to manipulate microphone position. These solutions are expensive and difficult to implement and thus, not widely adopted.

Accordingly, a need remains for an improved teleconferencing system.

BRIEF DESCRIPTION OF THE DRAWINGS

The foregoing and other objects, features, and advantages of the invention will become more readily apparent from the detailed description of an embodiment that references the following drawings.

DETAILED DESCRIPTION OF THE PREFERRED EMBODIMENT

Figure 1:
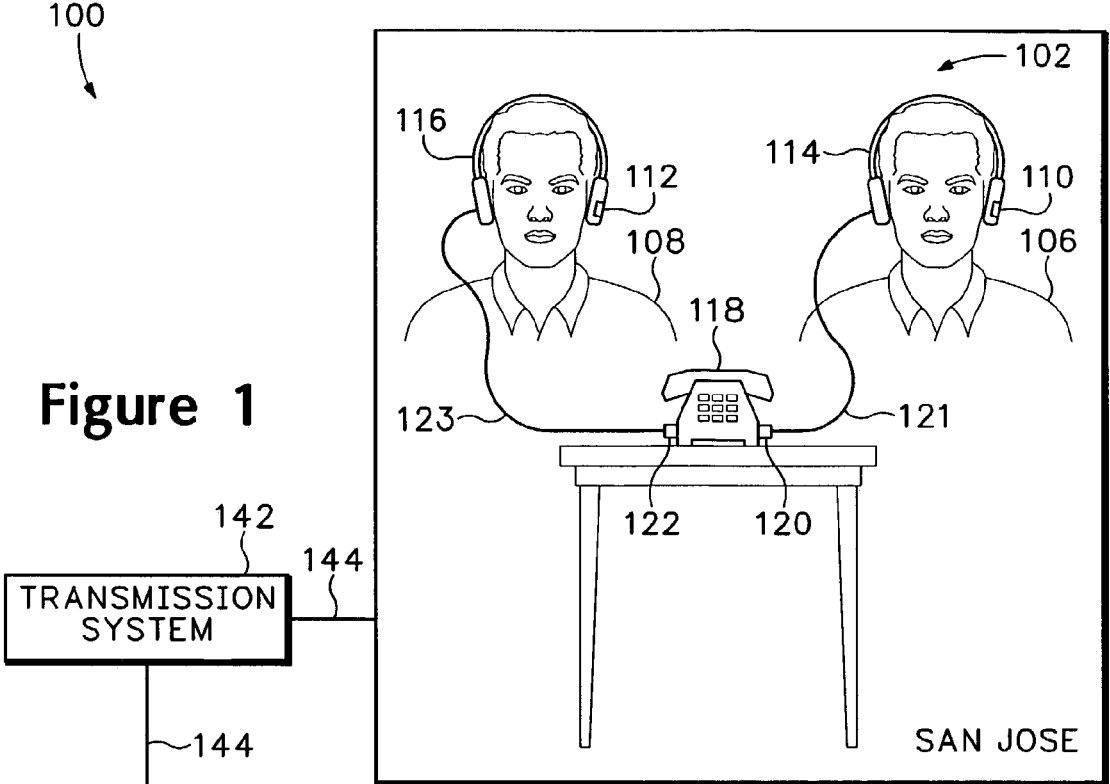
FIG. 1 is a diagram of an embodiment of the present invention.
Figure 1:
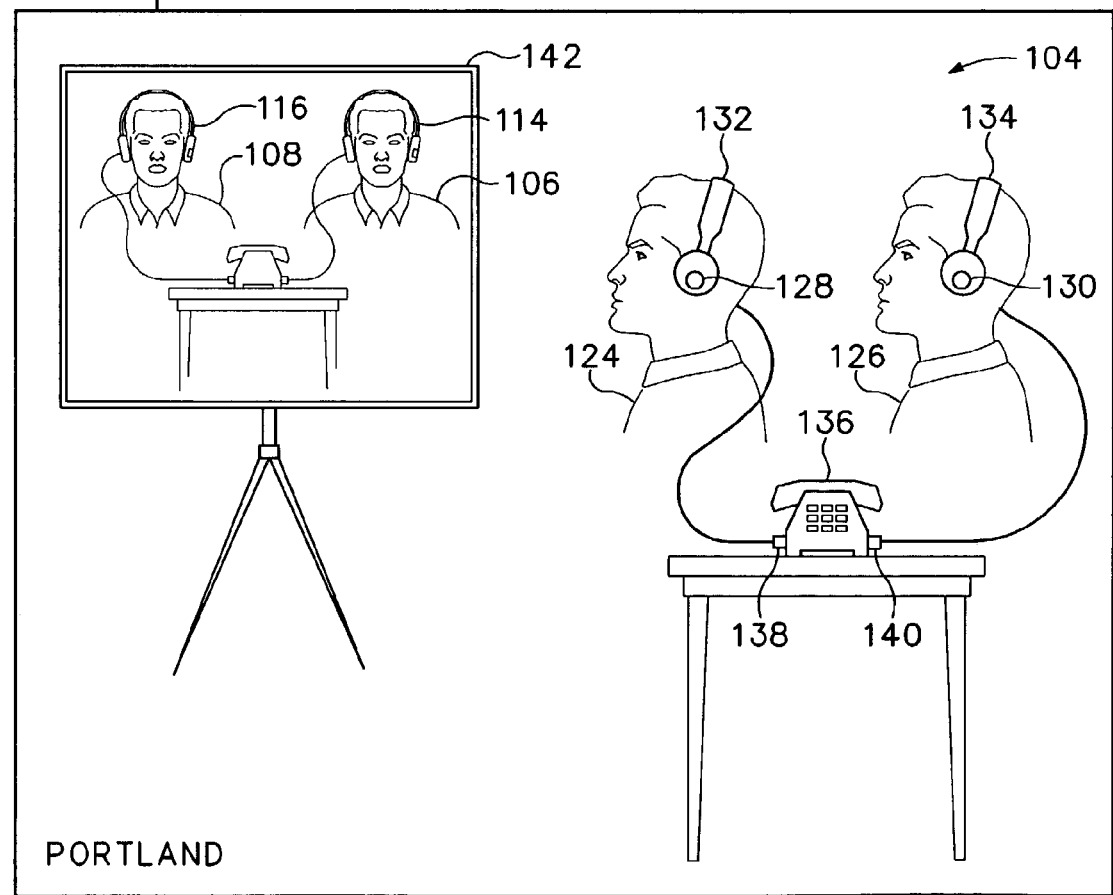

Referring to FIG. 1, a system 100 includes a first station 102 located in first location, e.g., San Jose, Calif., and a second station 104 located in a second remote location, e.g., Portland, Oreg. A person of reasonable skill in the art should understand that any number of stations in a plurality of remote locations comes within the scope of the invention. A person of reasonable skill in the art should understand that a remote location refers not only to locations in different cities (or countries), but also to locations in different portions of a same regional area (e.g., different areas within a same city).

The first station 102 includes conference participants 106 and 108. A person of reasonable skill in the art should understand that the invention might accommodate any number of conference participants. Each of the conference participants 106 and 108 include a corresponding spatial preference sensor 110 and 112 located on earphones 114 and 116, respectively. The earphones 114 and 116 are electrically coupled to a first phone 118 through jacks 120 and 122, respectively, and associated cabling 121 and 123, respectively.

Likewise, the second station 104 includes conference participants 124 and 126. Each of the conference participants 124 and 126 include a corresponding spatial preference sensor 128 and 130 located on earphones 132 and 134, respectively. The earphones 132 and 134 are electrically coupled to a second phone 136 through jacks 138 and 140. A second station 104 might additionally include a display screen 142 to visually display the participants 106 and 108 in the first station 102.

A person of reasonable skill in the art should understand that the spatial preference sensors 110, 112, 128, and 130 need not be located only on earphones, but can be located in a variety of different apparatus or on the conference participant himself without departing from the scope of the present invention. A person of reasonable skill in the art should understand that the spatial preference sensors 110 and 112, and 128 and 130 might be wirelessly coupled to the first and second phones 118 and 136, respectively. A person of reasonable skill in the art should recognize that the first and second phones 118 and 136, respectively, are interchangeable in that they might include same electronics but that their operation might differ depending on the communication direction (i.e., whether they are sending or receiving communication).

The first and second phones 118 and 136, respectively, are coupled to each other through the transmission system 142 and cabling 144. The transmission system 142 can be a private branch exchange (BBX) system, a local area network (LAN), wide area network (WAN), a global network (e.g., Internet), and the like. The transmission system 142 can likewise be a wireless network that uses, for example, high frequency radio waves rather than cabling to communicate between two stations 102 and 104.

Figure 2:
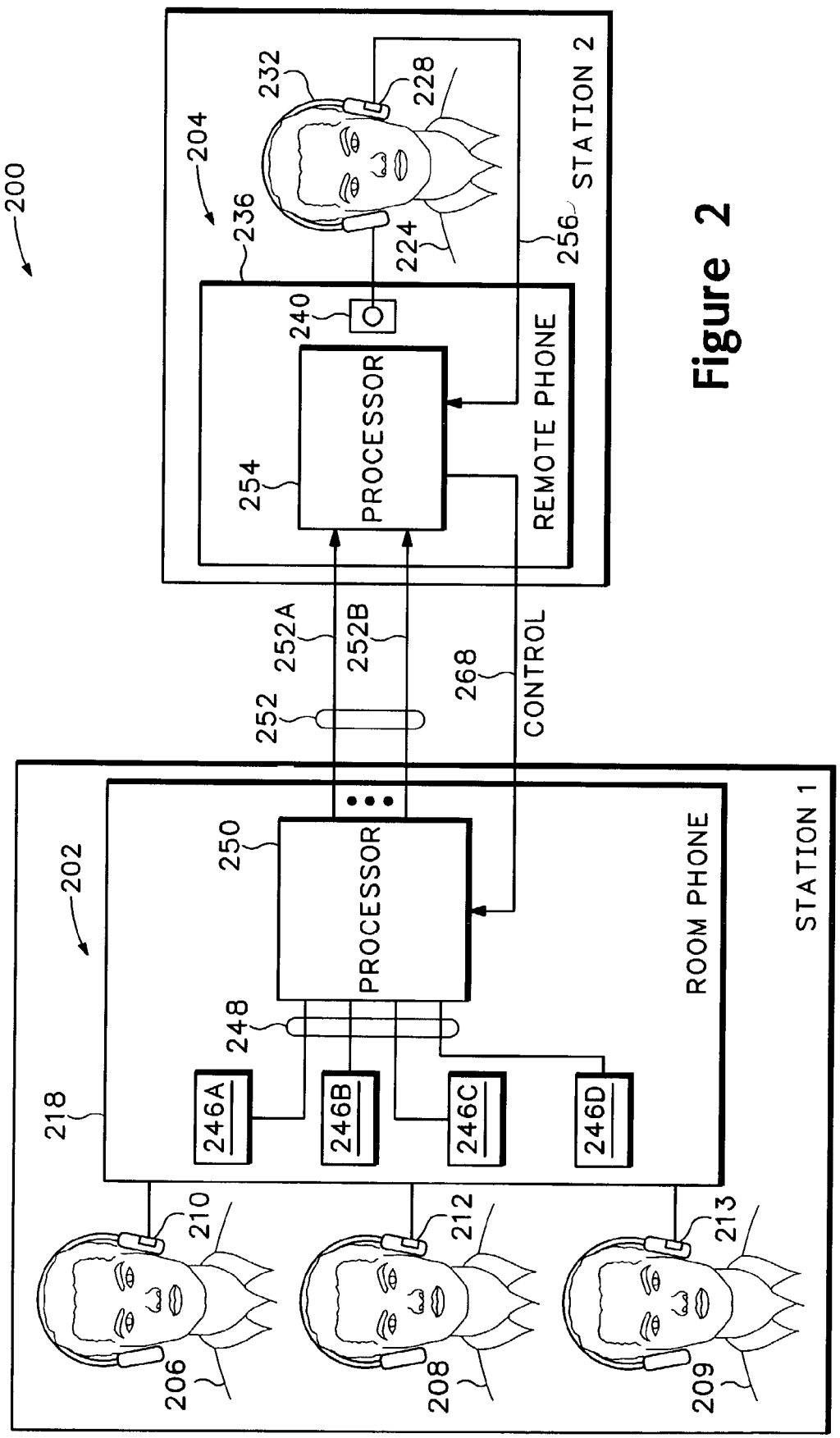
FIG. 2 is a block diagram of an embodiment of the present invention.

Referring to FIG. 2, a room or first phone 218 in a first station 202 includes a plurality of microphones 246A–246C and a processor 250. Each of the plurality of microphones 246A–246C picks up sound waves created when the conference participants 206, 208, and 209 speak and converts the sound waves into sound source signals 248. The processor 250 spatially processes the sound source signals 248 responsive to one or more directional selectivity commands on signal 256 to generate the spatially processed signals 252. The processor 250 provides the spatially processed signals 252 to a second, remotely located, phone 236. A person of reasonable skill in the art should recognize that the room phone 218 might include any number of microphones, e.g., four microphones 246A–246D as shown in FIG. 2. And a person of reasonable skill in the art should recognize that the room phone 218 might generate any number of spatially processed signals 252, e.g., two stereo audio signals 252A and 252B.

The remote phone 236 receives the spatially processed signals 252 and provides them to the participant 224 through earphones 232 connected via jack 240. In one embodiment, the jack 240 is a stereo headphone jack. More particularly, a processor 254 within the phone 236 receives and directs the signals 252.

In one embodiment, the spatial preference sensor 228 is a position sensor that indicates a head position or angular direction in a horizontal plane (e.g., an x-axis) of the participant 224. The participant 224 indicates his spatial listening preferences by turning his head in a desired direction. The sensor 228, in turn, generates the directional selectivity signal 256 indicative of his head position. In one embodiment, the directional selectivity signal 256 is a low bit rate feedback signal.

In another embodiment, the spatial preference sensor 228 is a position sensor that indicates a head tilt or angular direction in a vertical plane (e.g., a y-axis). A person of reasonable skill in the art should recognize that the spatial preference sensor 228 is any biometric input device capable of converting biological phenomena, e.g., the turning of a person's head in one direction or another, into an electrical signal.

The processor 250 uses the directional selectivity signal 256 to spatially pre-process the input signals 248 thereby generating the signals 252. And the processor 254 provides the directional selectivity signal 256 to the processor 250 as control input 268.

In one embodiment, the directional selectivity signal 256 indicates a listening direction corresponding to a head position and a listening focus (or depth) within that listening direction corresponding to a head tilt. For example, the participant 224 turns his head in a westerly direction to indicate he wants to accentuate sounds being picked up by the plurality of microphones in station 1 that are westerly aligned. The participant 224 then tilts his head forward to indicate that he wants to focus on the forward sound within the westerly subset of sounds being picked up by the microphones in station 1.

In one embodiment, the control input 268 is a low bit rate feedback signal. The processors 254 and 250 use the directional selectivity signal 256 and the control input 268, respectively, to spatially process the signals 248 and 252 as we explain in more detail below.

The processors 250 and 254 might spatially process the signals 248 and 252 in a plurality of manners. Connor et al. (U.S. Pat. No. 6,011,851, assigned to the same assignee as the present application and incorporated herein by reference) describes one such mechanism for spatially processing input sound waves. In Connor, the spatial processor(s) move received sound sources to different audibly perceived point sources. The outputs from the spatial processor(s) are mixed into a stereo signal with left and right outputs and then output to a conference participant. Connor moved important sound sources to a foreground point source for increased intelligibility while simultaneously moving less important sound sources to a background point source.

In like manner, small motions of the participant's head in a vertical or horizontal direction, for example, generates the directional selectivity signal 256 that indicates to the processors 250 and 254 the direction of the input sound source 248 it wants and the depth of the input sound source within that direction that it wants moved to a foreground point source.

Figure 3:
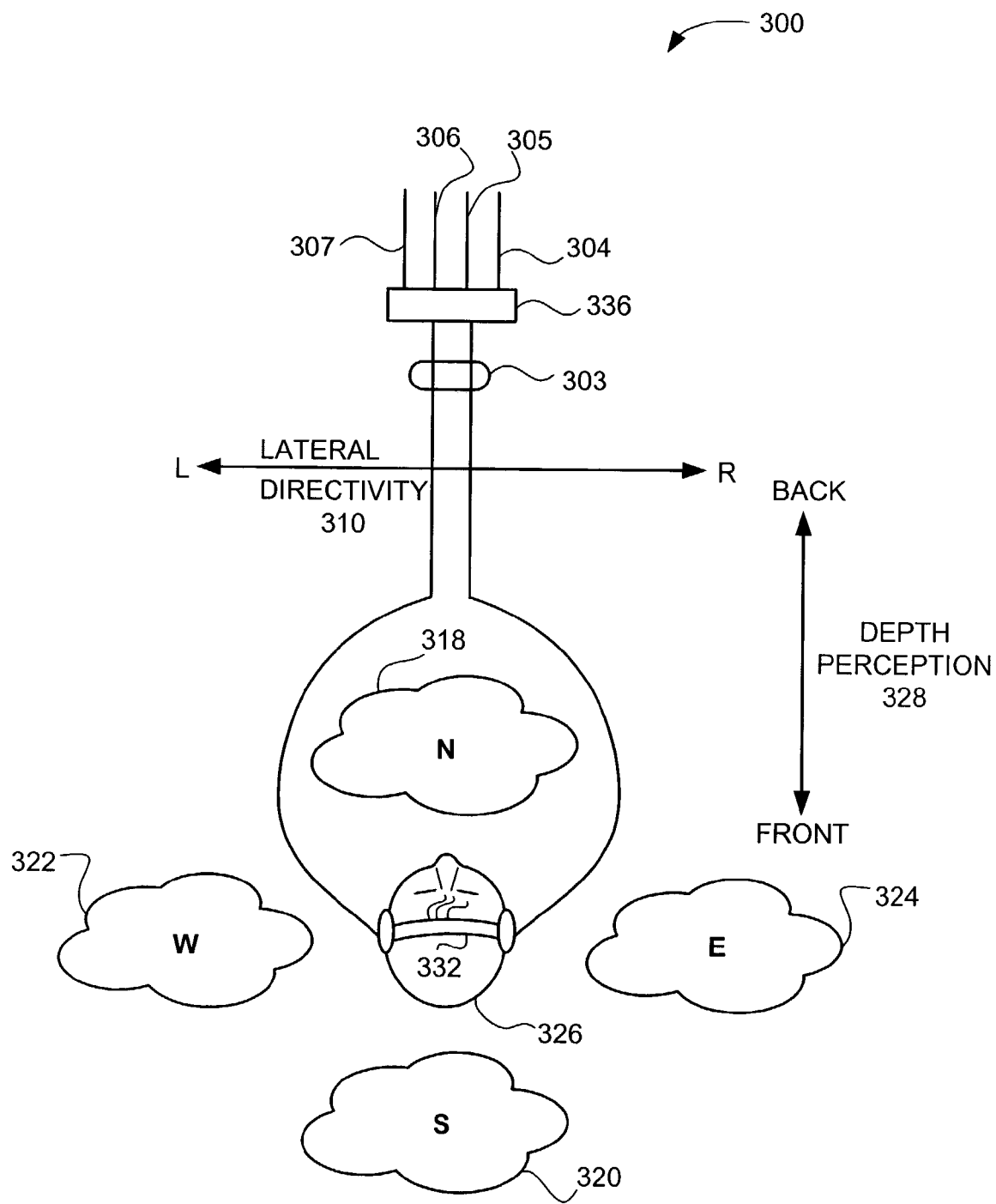
FIG. 3 is a block diagram of a user perception of incoming sound sources according to the invention.

Referring to FIGS. 2 and 3, a room phone 218 receives, assigns, and processes a plurality of incoming sound signals or sources from participants 206, 208, and 209 through a plurality of microphones, e.g., microphones 246A–D. Each of the microphones 246A–D might have directional selectivity, e.g., at 90-degree angles pointing North, South, East, and West. The room phone 218 spatially processes these signals at 250 and transmits a plurality of signals 252 to the remote phone 236.

The room phone 218 transmits four monoaural audio signals 304, 305, 306, and 307 to the remote phone 336. The remote phone 336 processes the four incoming signals 304, 305, 306, and 307 responsive to the directional selectivity signal 256. In one embodiment, the directional selectivity signal 256 indicates the participant's head position that, in turn, indicates a particular listening preference. The remote phone 336 processes the four incoming signals 304, 305, 306, and 307 into a single stereo signal 303 fed to the headphones 332. By doing so, the participant 326 perceives each of the four signals 304, 305, 306, and 307 as having a particular volume, depth 328, and position 310, e.g., spatial positions 318, 320, 322, and 324. That is, the participant 326 perceives the processed signals 304, 305, 306, and 307 as coming from spatial locations 318, 320, 322, and 324.

The room phone 218, therefore, processes the combined sound sources from station 1, e.g., the combined voices of participants 206, 208, and 209, into four signals 304, 305, 306, and 307. These signals are then spatially processed down to two (stereo) signals 303 by the remote phone 336 responsive to the directional selectivity signal 256.

If the participant 326 moves his head 10 degrees clockwise (from North towards East), the remote phone 336 repositions the four signals 304, 305, 306, and 307 by processing them such that the participant 326 perceives them at new spatial positions moved 10 degrees counterclockwise from their original positions 318, 320, 322, and 324. Put differently, the remote phone 336 responds to an angular change (e.g., a change in the participant's head position) by making a corresponding change in the assigned virtual space positions of the four source signals 304, 305, 306, and 307. In one embodiment, the spatial processor 254 makes this change by changing positioning parameters (not shown). The result mimics the audio effect this participant 326 would have if he had been sitting at station 1 and had turned 10 degrees clockwise.

The change in a participant's head position in an x-axis (horizontal swing) might be an angular control whereas a change in the participant's head position in a y-axis (vertical tilt) might be a focus control. The focus control allows the spatial processor 254 to bias the sound sources such that when they are angularly closer to being directly in front of the participant 326, they are also automatically louder relative to the other sources. This allows the participant 326 to move certain sound sources to a foreground and relegate others to a background. The focus control allows the participant 326 the ability to amplify in the direction that he is tilting and/or pointing his head. The focus control, e.g., the participant 326's head tilt, might be measured using the same sensor 228. The focus control, e.g., the participant 326's head tilt, might be measured independently of the head's angular position using any means capable of converting head tilt into electrical signals. In one embodiment, the focus control is a knob or other secondary control input.

Figure 4:
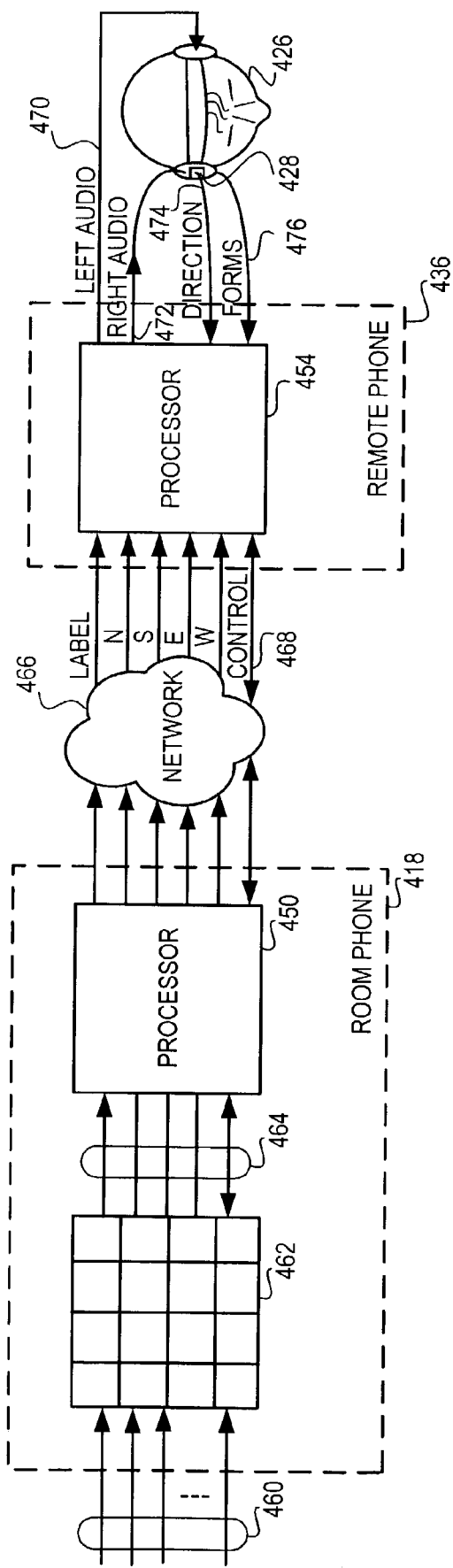
FIG. 4 is a block diagram of an embodiment of the present invention.

FIG. 4 is an embodiment of the present invention. Referring to FIG. 4, a plurality of sound sources 460 are detected by an array of directional microphones 462. The sound sources 460 need not be limited to conference participants' voices and might likewise be a voice mail application, an audio newscast, and the like. Each microphone in the array 462 has a particular direction to which it is particularly sensitive. That is, each microphone 462 is more sensitive to sound sources originating at a particular direction. A person of reasonable skill in the art should understand that the array of microphones 462 might be embodied in a variety of fashions, including being a grid of microphones evenly spaced and hung about the room 102 (FIG. 1) or included as part of the room phone 418.

The array of microphones 462 converts the sound sources 460 to signals 464 it provides to the spatial processor 450. The processor 450 spatially processes the signals 464 responsive to, e.g., a fade/switch control that selects which audio signals are being combined and at what volume levels to combine them. The design of the fade/switch control is well known and will not be discussed in any detail.

The processor 450 generates source signals 404, 405, 406, and 407, e.g., corresponding to the North, South, East, and West directions. A person of reasonable skill in the art should recognize that the processor 450 might generate any number of signals. And the processor 450 generates label 466 and control information 468. The control information 468 might indicate to the processor 454 the number sound sources 464 and the manner in which they were spatial processed. Or the control information 468 might indicate to the processor 454 the number of microphones in the array 462 and their relative position. More generally, the control information 468 might indicate to the processor 454 the specific spatial processing done by the processor 450.

The remote phone 436 receives the source signals 404, 405, 406, and 407 and the control information 468 from the room phone 418. And the remote phone 436 receives the direction and focus signals 474 and 476, respectively, from the spatial preference sensor 428. Thus, at any given time, the remote phone 436 knows the participant's listening preferences by virtue of, e.g., the horizontal and/or vertical direction of the participant's head as sensed by the spatial preference sensor 428 and, therefore, how the participant would like the processor 450 to spatially process, e.g., dampen or amplify, the signals 464. And the remote phone 436 knows the actual spatial processing of the source signals 404, 405, 406, and 407 currently being delivered to the remote phone 436 via the control information 468. The processor 454 spatially processes the signals 404, 405, 406, and 407 responsive to the direction and focus signals 474 and 476, respectively, from the spatial preference sensor 428.

For example, the remote phone 436 receives the direction signal 474 indicating the participant 426 faces north. In response thereto, the remote phone 436 sends a control signal 468 to the room phone 418, and the processor 450 commanding it to take its highly selective directional microphones 462 and give the remote phone 436 the four sound source signals corresponding to a predetermined grouping of the microphone array 462, e.g., the front 9, rear 9, left 9, and right 9 of a 36 microphone array 462.

The processor 454 in the remote phone 436 spatially processes the source signals 404, 405, 406, and 407 responsive to the fader/switch (not shown) included therein. The processor 454 delivers the left and right stereo signals 470 and 472, respectively, to the participant 426. The participant 426 then turns his head to a new position, e.g., the 45-degree position. The direction and focus signals 474 and 476, respectively, change according to the participant's new head position. The remote phone 436 adjusts the spatial processing done by the processor 454 to the currently received signals 404, 405, 406, and 407 to get the best approximation it can of the participant's listening preferences. The remote phone 436 provides the control information 468 to the room phone 418 and its processor 450 via the network 442 so that it can re-process the original sound sources.

The room phone 418 then recalculates the mix of the original sound sources 464 that would best meet the participant's listening preferences. This is a new mix of sources since, in our example, which of the 36 sound sources (corresponding to 36 microphones in array 462) belong in which of the four groups of 9 is now different. The processor 450 responds by spatially re-processing the sound sources 464 responsive to the control information 468. The processor 450 transmits the re-processed signals 404, 405, 406, and 407 together with a label 466. The label 466 indicates to the remote phone 436 that the processor 450 has spatially re-reprocessed signals 404, 405, 406, and 407 as indicated by the participant's new listening preferences. In one embodiment, the label 466 is meta-data included with the signals 404, 405, 406, and 407. The labels 466 change when the processor 450 re-processes the sound sources 464 responsive to the control information 468 from the remote phone 436. Thus, the signals 404, 405, 406, and 407 newly received by the remote phone 436 represent a better mix of the sound sources. The remote phone 436 again changes its spatial processing to generate the left and right audio signals 470 and 472, respectively, using the re-processed signals 404, 405, 406, and 407. By so locally and remotely spatially processing and re-processing the signals 404, 405, 406, and 407 responsive to the participant's listening preferences, any latency due to the network is avoided improving the participant's audio enjoyment.

There is no limit to the number of different foreground or background positions that can be created for different incoming sound sources. Human audio perceptual capabilities, however, may limit the number of useful simultaneous foreground and background positions.

Figure 5:
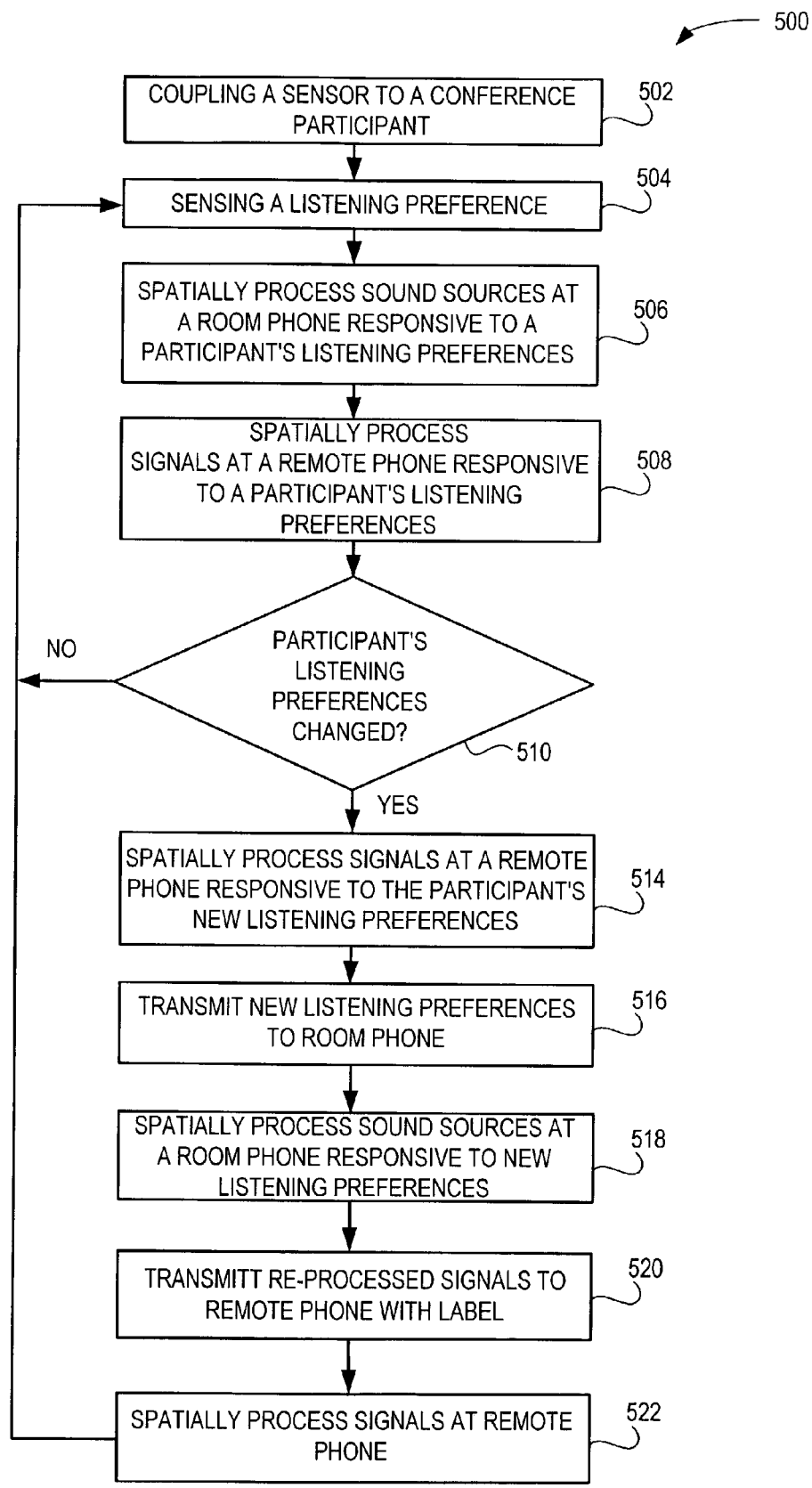
FIG. 5 is a flowchart of an embodiment of the present invention.

FIG. 5 is a block diagram of an embodiment of the method of the present invention. Referring to FIG. 5, the method couples a spatial preference sensor to a participant at 502. At box 504, the method senses a participant's listening preferences using the sensor. In one embodiment, as described earlier, the spatial preference sensor is coupled via earphones to a participant's head. The sensor will measure small movements of the participant's head in a horizontal or vertical direction. At box 506, the method spatially processes sound sources responsive to the participant's listening preferences. The spatial processing of the sound sources occurs at a room phone. The room phone transmits the processed signals to a remote phone. At box 508, the method spatially processes the processed signals at a remote phone responsive to the participant's listening preferences. At 510, the method determines whether the participant has changed its listening preferences as indicated, for example, by moving his head in a particular direction. If he has not, the method continues monitoring the participant's listening preferences at 504. If he has, the method spatially processes the signals in the remote phone responsive to the participant's new listening preferences. The remote phone transmits the new listening preferences to the room phone at 516. The room phone spatially re-processes the original sound sources responsive to the participant's new listening preferences at 518. At box 520, the room phone transmits the re-processed signals to the remote phone together with a label indicating new spatial processing. At box 522, the remote phone re-processes the signals received from the room phone responsive to the participant's new listening preferences.

We have illustrated and described the principles of our invention, it should be readily apparent to those skilled in the art that we might modify the invention in arrangement and detail without departing from such principles. We claim all modifications coming within the spirit and scope of the accompanying claims.

I claim:

1. A conference phone adapted to receive a plurality of input audio signals, comprising:
   a spatial preference sensor adapted to identify a preference associated with at least one conference participant; and
   a processor adapted to generate a plurality of output audio signals, by spatially processing the plurality of input audio signals responsive to the spatial preference sensor.

2. The conference phone of claim 1 where the spatial preference sensor indicates a position of the at least one conference participant.

3. The conference phone of claim 2 where the spatial preference sensor indicates a head position of the at least one conference participant.

4. The conference phone of claim 1
   where the preference is a sound direction; and
   where the processor spatially processes the plurality of input signals as being sourced from the sound direction.

5. The conference phone of claim 1
   where the preference is a sound direction; and
   where the processor moves one of the plurality of input signals to a foreground while moving the remaining input signals to background positions.

6. The conference phone of claim 1 comprising earphones housing the spatial preference sensor.

7. The conference phone of claim 6 comprising a jack, the earphones being coupled to the conference phone through the jack.

8. The conference phone of claim 1 comprising a plurality of microphones adapted to convert a plurality of sound sources into the corresponding plurality of input audio signals.

9. A conference system, comprising:
   at least one remote phone including a spatial preference sensor; and
   a room phone adapted to convert a plurality of sound sources into a corresponding plurality of input audio signals responsive to the spatial preference sensor.

10. The system of claim 9 including a transmission system to transmit the plurality of input audio signals from the room phone to the at least one remote phone.

11. The system of claim 9 where the room phone includes a plurality of microphones adapted to pick up the plurality of sound sources from a corresponding plurality of conference participants.

12. The system of claim 9 where the spatial preference sensor is housed in a set of earphones coupled to the at least one remote phone.

13. The system of claim 9 where the spatial preference sensor indicates a listening preference of a conference participant located in a remote room.

14. The system of claim 13 where the listening preference includes directional selectivity.

15. The system of claim 9 where the spatial preference sensor indicates a head position of a conference participant located in a remote room.

16. The system of claim 9
   where the room phone includes a processor adapted to generate a plurality of sound signals by spatially processing the plurality of sound sources responsive to the spatial preference sensor; and
   where the remote phone includes a processor adapted to spatially process the plurality of sound signals responsive to the spatial preference sensor.

17. The system of claim 9 where the spatial preference sensor senses a participant's motion and converts the sensed motion into a sensor signal capable of indicating the participant's directional listening preference.

18. The system of claim 9 where the at least one remote phone locally spatially post processes the transmitted plurality of input signals responsive to the spatial preference sensor.

19. A method of conferencing, comprising:
   sensing directional sound selectivity using a sensor coupled to the conference participant; and
   processing a plurality of sound sources responsive to the sensing.

20. The method of claim 19 where coupling includes adapting the sensor to indicate the conference participant's head position.

21. The method of claim 19 where processing comprises:
   locally processing a plurality of sound signals responsive to the directional selectivity; and
   remotely processing the plurality of sound sources responsive to the directional selectivity.

22. The method of claim 21 including transmitting the remotely spatially processed plurality of sound sources from a room phone to a remote phone.

23. The method of claim 22 where processing comprises:
   detecting a listening preference;
   locally spatially processing the sound signals responsive to the listening preference; and
   remotely spatially processing the sound sources responsive to the listening preference.

24. The method of claim 23
   where locally spatially processing comprises transmitting control information relating to the local spatial processing and the listening preference; and
   where remotely spatially processing comprises transmitting a label relating to the remote spatial processing.

25. The method of claim 19 where processing includes:
   spatially pre-processing the plurality of sound sources at a room phone; and
   spatially post-processing a plurality of input audio signals at a remote phone.

* * * * *